Figure 1:
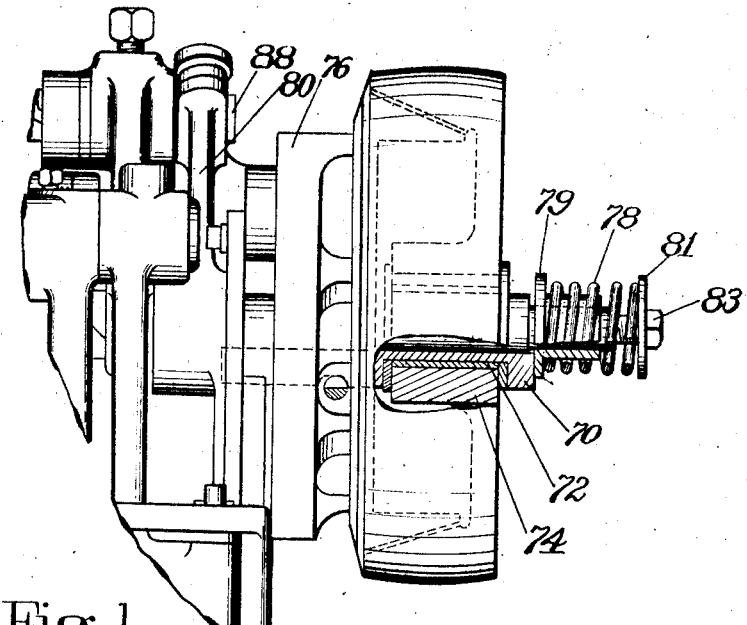

O. ASHTON.
STOP MECHANISM.
APPLICATION FILED NOV. 30, 1908.

1,026,067.

Patented May 14, 1912.

WITNESSES.
Elizabeth C. Coupe
Edith C. Holbrook

INVENTOR.
Orell Ashton
By his Attorney,
Nelson W. Howard

UNITED STATES PATENT OFFICE.

ORRELL ASHTON, OF LAWRENCE, MASSACHUSETTS, ASSIGNOR TO UNITED SHOE MACHINERY COMPANY, OF PATERSON, NEW JERSEY, A CORPORATION OF NEW JERSEY.

STOP MECHANISM.

1,026,067.  Specification of Letters Patent.  Patented May 14, 1912.

Application filed November 30, 1908. Serial No. 465,076.

*To all whom it may concern:*

Be it known that I, ORRELL ASHTON, a citizen of the United States, residing at Lawrence, in the county of Essex and Commonwealth of Massachusetts, have invented certain Improvements in Stop Mechanism, of which the following description, in connection with the accompanying drawings, is a specification, like reference characters on the drawings indicating like parts in the several figures.

This invention relates to improvements in stop mechanism, and the object of the invention is to provide a stop mechanism of simple construction which shall be durable and reliable in operation.

To this end the invention consists in the features and combinations of parts hereinafter described and defined in the appended claims.

Figure 2:
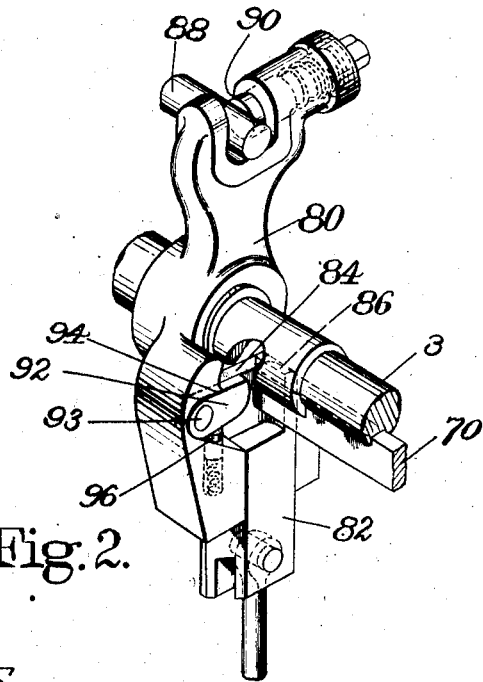

In the drawings, Figure 1 is a view in side elevation with parts in vertical section of stop mechanism constituting one embodiment of the invention, showing also a portion of a machine to which said mechanism is applied; Fig. 2 is a perspective view showing in detail a portion of the mechanism of Fig. 1.

Referring to the drawings, the reference numeral 3 indicates a shaft actuated by the mechanism to be described. The shaft 3 is provided with a longitudinal groove in which is received a member 70. The member 70 is provided intermediate its ends with a slot in which is received a collar 72. A driving pulley 74 is mounted upon the collar 72 to rotate freely thereon, but is restrained from movement longitudinally thereof. A member 76 is mounted upon the shaft 3 in fixed relation thereto and is provided with a conical friction surface engaged by a similarly shaped surface upon the interior of the pulley 74. The construction is such that the pulley 74 moves longitudinally with the member 70, said member 70 being pressed toward the member 76 by a spring 78 encircling the shaft 3. A flanged sleeve 79 is arranged between the spring 78 and the member 70, the outer end of the spring engaging a washer 81 held from outward movement by a bolt 83 inserted in the end of the shaft. A lever 80 is pivotally mounted upon a bearing encircling the shaft 3, said lever being provided at its lower end with a guideway for a slide 82 connected to a treadle (not shown). The path of the slide 82 is in line with the inner end of the member 70 and said slide is provided at its upper end with an inclined or cam face 84 arranged to be engaged by the end of the member 70 in the rotation of the shaft 3, said member being thus forced longitudinally of the shaft against the resistance of the spring 78 to release the clutch. The slide 82 is provided upon its rear portion with a stop surface 86 which is engaged by the member 70 at the end of a revolution of the shaft 3 and serves to positively arrest said shaft. The lever 80 is arranged for a limited movement upon its support, said movement being limited by a stationary stud 88 secured to the frame of the machine and arranged within a forked portion of the lever. A spring-pressed plug 90 engaging the stud 88 is arranged upon the lever 80 to resist yieldingly rearward movement of the upper end of the lever.

To prevent rebound of the shaft 3 at the end of a revolution, a pawl 92, pivoted at 93, is arranged in the path of the member 70 and is held yieldingly against a stop surface 94 by a spring-pressed plunger 96. It will be seen that while the pawl 92 does not interfere with the movement of the shaft 3 in a left-handed direction, viewing Fig. 2, it prevents movement of said shaft in the reverse direction after the member 70 strikes the surface 86 upon the slide 82 at the end of a revolution.

In the use of the mechanism shown, the clutch is brought into operation to impart movement to the shaft 3 by depressing the slide 82. In this movement of the slide it is removed from engagement with the end of the member 70, allowing the latter to be moved to the left in Fig. 1 by means of the spring 78. The friction surfaces upon the pulley 74 and the fixed member 76 are thus brought into engagement and the shaft 3 is thereby placed in rotation. As will be obvious, this rotatory movement of the shaft 3 continues as long as the slide 82 remains depressed. When the slide 82 is allowed to rise, the inclined surface 84 upon its upper end is engaged by the member 70 and said member is thereby forced to the right in Fig. 1, removing the pulley 74 from frictional engagement with the fixed member 76. The momentum of the driven parts causes further movement of the shaft 3 until the member 70 comes in contact with the the stop surface 86 upon the slide 82. It will be seen that this stop surface is brought within the path of the member 70 in the upward movement of the slide 82. The impact of the member 70 upon the stop surface 86 is resisted through the pivotally supported lever 80 and the spring-pressed plug 90 by the stud 88 upon the frame of the machine. The movement of the shaft 3 is thus yieldingly arrested at the end of a revolution. After the momentum of the driven parts has been checked by the stationary stud 88 the lever 80 is returned to its normal position by the reaction of the spring-pressed plug 90. This causes a slight rearward turning movement or rebound of the shaft 3. This rebound is restricted to a small amount by the pawl 94 with which the member 70 has engagement and which is arranged to prevent movement in a rearward direction of the shaft 3. As will be obvious the impact of the member 70 upon the pawl 92 in the rebound is resisted through the lever 80 by the stationary stud 88.

Having described my invention, what I claim as new and desire to secure by Letters Patent of the United States is:—

1. The combination with a driven member held from turning movement upon a shaft, of a driving member, means for holding said driving member yieldingly in frictional engagement with the driven member, a longitudinal member connected to the driving member and extending through said driven member in a direction parallel to the shaft, a movable cam arranged to be brought into the path of said longitudinal member to force the driving member out of engagement with the driven member and a stop arranged to be brought into the path of the longitudinal member simultaneously with the cam to arrest the motion of the driven parts.

2. The combination with a driven member held from turning movement upon a shaft, of a driving member, means for holding said driving member yieldingly in frictional engagement with the driven member, a longitudinal member connected to the driving member and extending through said driven member in a direction parallel to the shaft, a slide arranged for movement transverse to the driven shaft, provided with a cam surface arranged for engagement with one end of the longitudinal member for forcing the driving member out of engagement with the driven member and with a stop surface arranged to arrest the motion of the driven parts by engagement with the longitudinal member, and means for sustaining the slide yieldingly against the impact of the longitudinal member.

3. The combination with a driven member held from turning movement upon a shaft, of a driving member, means for holding said driving member in frictional engagement with the driven member, a longitudinal member connected to the driving member extending through said driven member and arranged for sliding movement in a groove formed in the shaft, and a device arranged for movement into and out of the path of said longitudinal member provided with a cam surface for forcing said longitudinal member into an inoperative position wherein the driving member is out of engagement with the driven member, and with a stop surface arranged for engagement with the longitudinal member for arresting the motion of the driven parts.

4. The combination with a driven member held from turning movement upon a shaft, of a driving member, means for holding said driving member yieldingly in engagement with the driven member, a lever mounted for a limited amount of turning movement about an axis parallel with the axis of the shaft, means for holding said lever yieldingly from movement in the direction of movement of the driving member, and a slide arranged for movement upon said lever transverse to the shaft provided with a cam surface for forcing the driving member out of engagement with the driven member and with a stop surface for arresting movement of the driven parts.

5. The combination with a driven member held from turning movement upon a shaft, of a driving member, means for holding said driving member yieldingly in engagement with the driven member, a lever mounted for a limited amount of turning movement about an axis parallel with the axis of the shaft, means for holding said lever yieldingly from movement in the direction of movement of the driving member, a slide arranged for movement upon said lever transverse to the shaft provided with a cam surface for forcing the driving member out of engagement with the driven member and with a stop surface for arresting movement of the driven parts and a pawl mounted upon said lever for checking the rebound of the driven member.

In testimony whereof I have signed my name to this specification in the presence of two subscribing witnesses.

ORRELL ASHTON.

Witnesses:
 EDITH C. HOLBROOK,
 FREDERICK L. EDWARDS.